Dec. 25, 1928.
R. A. CURRIE
1,696,567
BAIL CONSTRUCTION FOR LANTERNS AND THE LIKE
Filed Oct. 18, 1926
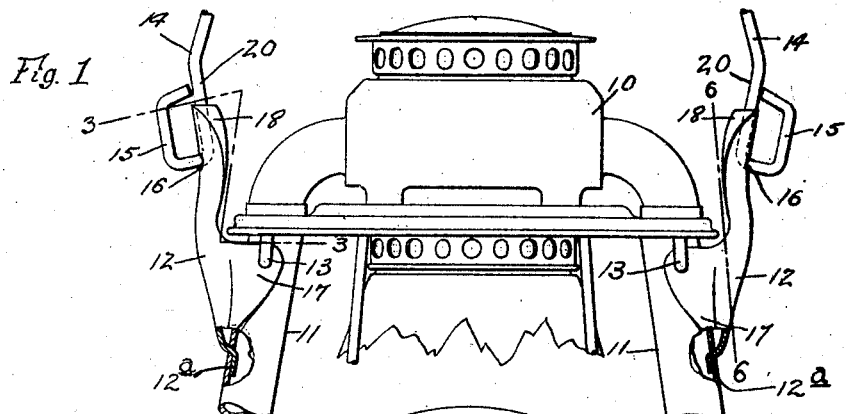
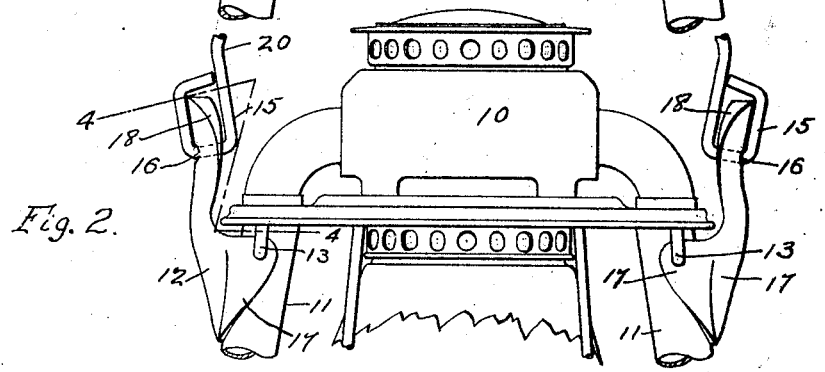
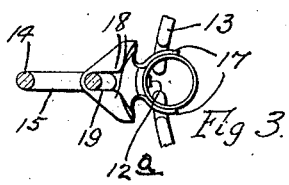 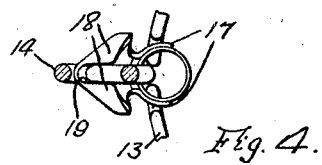 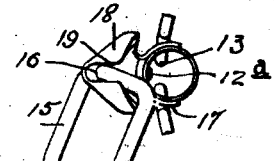
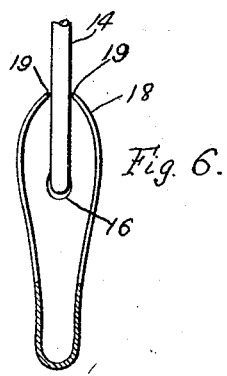 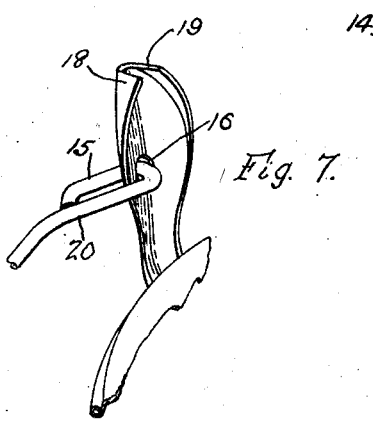
INVENTOR.
Robert A. Currie
by Parker & Prochnow
ATTORNEYS.

Patented Dec. 25, 1928.

1,696,567

UNITED STATES PATENT OFFICE.

ROBERT A. CURRIE, OF SYRACUSE, NEW YORK, ASSIGNOR TO R. E. DIETZ COMPANY, OF NEW YORK, N. Y.

BAIL CONSTRUCTION FOR LANTERNS AND THE LIKE.

Application filed October 18, 1926. Serial No. 142,270.

This invention relates to improvements in bail constructions for lanterns and analogous articles which are commonly provided with swinging bails.

One object of the invention is to provide a bail ear or attaching device, particularly for lanterns, which is simple and inexpensive but of strong, rigid and durable construction, and is adapted to positively hold the bail upright rigidly with respect to the lantern so that the lantern can be manipulated or moved to and held in different positions by means of the bail, as may be required for signalling or other purposes, without danger of the lantern swinging on the bail, while nevertheless the bail can be readily swung down to a position at the side of the lantern simply by springing the bail out of holding engagement with the retaining portions of the ears.

Another object is to improve the construction of bail ears or bail attaching devices for lanterns and analogous objects, whereby the advantages and improvements hereinafter appearing and set forth in the claims are attained.

In the accompanying drawings:

Fig. 1 is a front elevation of the upper portion of a lantern provided with a bail and bail ears embodying the invention and showing the position of the parts when the bail is held rigid with the lantern.

Fig. 2 is a similar view showing the position of the parts to permit the bail to be swung down at the side of the lantern.

Fig. 3 is a section on line 3—3, Fig. 1.

Fig. 4 is a similar section on line 4—4, Fig. 2.

Fig. 5 is a plan view of one of the bail ears and showing the connected end of the bail swung down out of its upright position.

Fig. 6 is a sectional elevation of one of the bail ears and connected end of the bail on line 6—6, Fig. 1.

Fig. 7 is an inner side perspective view of the bail ear and connected end of the bail showing the bail swung down out of upright position.

10 represents the upper portion of the frame of a lantern. The lantern illustrated is a railway signal lantern such as used by trainmen for signalling and other purposes, but the bail ear and bail construction forming the subject of this invention is applicable to other types of lanterns and also to other receptacles or objects which are ordinarily provided with arched bails or handles for carrying and manipulating such objects. The lantern frame shown is provided with upright side tubes 11 to which the bail ears, shown at 12, may be rigidly secured in the usual or any suitable manner. As shown, the ears are soldered to the tubes. At the lower end of the bail ear is preferably formed a lug 12ª which enters a slot in the tube, for the purpose of holding the ear in position while the frame is being dipped in the tinning bath and also for increasing the strength of attachment. The ends of the top wires 13 of the lantern frame preferably pass through the lower portions of the ears into the side tubes and furnish additional security. The bail ears, as usual are arranged at opposite sides of the frame 10, and the bail 14, which may consist of a piece of wire bent into arched or U-shape, is formed at its opposite ends with loops or eyes 15 which pass through and are adapted to pivot in holes 16 in the bail ears so that the bail can be swung from a standing position to a lateral or hanging position at either side of the lantern.

Each of the bail ears, which are alike, consists of a sheet metal stamping or single piece of sheet metal, suitably formed into the shape shown. The bail ear is bent or of trough shape in cross section, the lower portions 17 of the side flanges of the ear preferably being extended and curved to conform to and fit closely against the surface of the tube 11 to which they are fastened. That portion of the bail ear which projects upwardly from the lantern frame has relatively wide or deep side flanges which stiffen the ear and make it strong and rigid so that it cannot be bent or broken by any ordinary usage of the lantern or device to which it is attached. At their upper portions, the edges of the side flanges are bent or extend inwardly and toward each other, as shown at 18, so as to provide transversely extending bail-engaging parts or edges 19 at the upper end of the bail ear. These edges 19 are spaced apart a distance only slightly more than the diameter of the bail wire, and extend substantially parallel with each other and with a vertical plane passing through the pivot holes of the bail ears at opposite sides of the lantern. The lower portions 20 of the legs of the bail are preferably shaped so that in the standing position of the bail, shown in Fig. 1, these lower portions of the legs will extend substantially parallel with the upper portions of the bail ears above the pivot hole thereof and bear outwardly flat against the inner faces of the ears, as shown in Fig. 1. In this position of the bail, each leg extends between the transverse top edges 19 of the bail ear to which the leg is pivoted, and these edges, by engaging the opposite sides of the leg, prevent the bail from swinging in the pivot hole 16 of the ear. Since the top edges 19 of the bail ears extend substantially perpendicular to the direction in which the bail is adapted to swing on the ears, the edges 19 will positively hold the bail from turning in the pivot holes of the ears unless the legs of the bail are sprung inwardly far enough to clear the holding edges 19. The tendency of the legs of the bail to spring apart, due to the resilience of the bail, normally retains the legs in the slots between the holding edges 19 so that normally the bail will be retained stationarily in upright position. Preferably, the loops or eyes 15 of the bail are of substantially rectangular form with the lower cross bars or pivots of the loops substantially perpendicular to the lower portions 20 of the legs, and the loops are of sufficient width to permit the legs of the bail to be sprung inwardly far enough to disengage the legs from the retaining edges 19 of the bail ears. Thus, while the bail, when swung to an upright position, will normally be retained stationarily and rigidly in this position by engagement with the edges 19 of the ears, nevertheless, if it is desired to swing the bail downwardly from its upright position, it is only necessary to spring the lower ends of the bail inwardly until they clear the top holding edges 19 of the ears. The bail can then pivot freely in the ears.

By the described construction, the bail ear is formed with a curved and smooth outer side or face free from sharp edges or corners, and inwardly extending side flanges or portions which, at their lower ends embrace and are secured to the lantern frame, and at their upper portions straddle and normally engage and hold the legs of the bail. Thus, the upper as well as the lower portions of the flanges of the ear extend inwardly or in substantially the same direction, and the ear can be made by a relatively single stamping or forming operation, which makes the ear much less expensive to produce than if it were of a form requiring flanges or portions to be bent in opposite or different directions. Furthermore, by this form and arrangement of the ears, with their side flanges extending inwardly, the lower portions of the legs of the bail spring outwardly into engagement with the holding edges 19 of the ears. Since the bails are ordinarily formed by bending from straight wire, the natural tendency is for the legs to spring apart or for the bail to resume the original straight condition, and the holding action of the ear will be more reliable and more enduring than in a construction in which the legs have to press toward each other or spring inwardly into holding engagement with the ears. Another advantage of this form and arrangement is that the outer faces or portions of the bail ears are smooth and curved and free from sharp edges or corners which are apt to catch on or mar objects or injure the hands of persons handling lanterns, as would be the case if the flanges or side portions of the bail were bent or extended outwardly instead of inwardly. Rough or sharp edges, even at the upper ends of the ears, are eliminated by the inbent side edges 18 of the ears, and these edges add further to the strength and rigidity of the upper ends of the ears.

I claim as my invention:

1. The combination of a bail and fixed bail ears to which said bail is pivotally connected, said ears consisting of trough-like sheet metal pieces having their side portions extending inwardly and holes in which the bail is pivoted, said side portions of the ears extending upwardly above the bail pivots and having upper parts which are rigid with said side portions and extend transversely inward substantially parallel with each other at opposite sides of the legs of the bail, whereby said upper parts are adapted to engage opposite sides of the legs of the bail and positively hold the bail from pivotal movement on the ears.

2. The combination of a bail and fixed bail ears to which said bail is pivotally connected, said bail ears consisting of trough-like sheet metal pieces having inwardly extending side portions and pivot holes through which pivot portions of the bail extend outwardly, said side portions of the ears extending upwardly above said pivot holes and having upper parts which are rigid with said side portions and extend inwardly at opposite sides of the legs of the bail substantially perpendicular to the direction in which the bail swings pivotally on the ears, the pivotal connections between the bail and bail ears permitting the bail to be disengaged from said inwardly extending parts to allow the bail to swing on its pivotal axis.

3. A bail ear for lanterns and analogous objects consisting of a single trough-like piece of sheet metal having a pivot hole between its ends in which the bail is pivoted, the sides of the trough extending to the same side of the ear both below and above said pivot hole, and said side portions forming above said pivot hole opposite bail holding parts which are substantially parallel and extend substantially parallel with the pivotal axis of the bail, the pivotal connection between the bail and bail ear permitting the bail to be disengaged from said inwardly extending parts to allow the bail to swing on its pivotal axis.

4. A bail ear for lanterns and analogous objects consisting of a single trough-like piece of sheet metal having a pivot hole between its ends in which the bail is pivoted, the sides of the trough extending inwardly both below and above said pivot hole, and said side portions having above said pivot hole opposite top edges which are substantially parallel with the pivotal axis of the bail and are adapted to engage the bail at opposite sides to hold it from swinging.

5. A bail ear for lanterns and analogous objects consisting of a single trough-like piece of sheet metal having a pivot hole between its ends in which the bail is pivoted, the sides of the trough extending to the same side of the ear both below and above said pivot hole, and said side portions having above said pivot hole inbent margins which project towards each other and the top edges of which are substantially parallel and substantially perpendicular to the plane of said pivot hole.

6. In a lantern, a bail-pivoting ear comprising a strip of sheet metal having a bearing aperture for a bail, said aperture being located intermediate of its ends and also of its side edges, the side edge portions of the strip adjacent its free end being bent laterally from one face of the strip to form between them a laterally extending slot and into and out of which an arm of the bail may be moved.

7. In a lantern, a bail-pivoting ear comprising a strip of sheet metal having, intermediate of its ends and its side edges, an aperture in which a bail arm may be pivoted and also moved axially of the aperture, the side edge portions of the strip at its free end being bent laterally to form a channel of increasing depth towards the free end of the strip, into and out of which channel the bail arm may be moved by its said axial movements.

ROBERT A. CURRIE.